March 12, 1946. E. R. F. JOHNSON 2,396,267
DEVICE FOR VIEWING UNDERWATER BODIES
Filed Oct. 27, 1942 3 Sheets-Sheet 1

Inventor
Eldridge R. Fenimore Johnson
By
Attorney

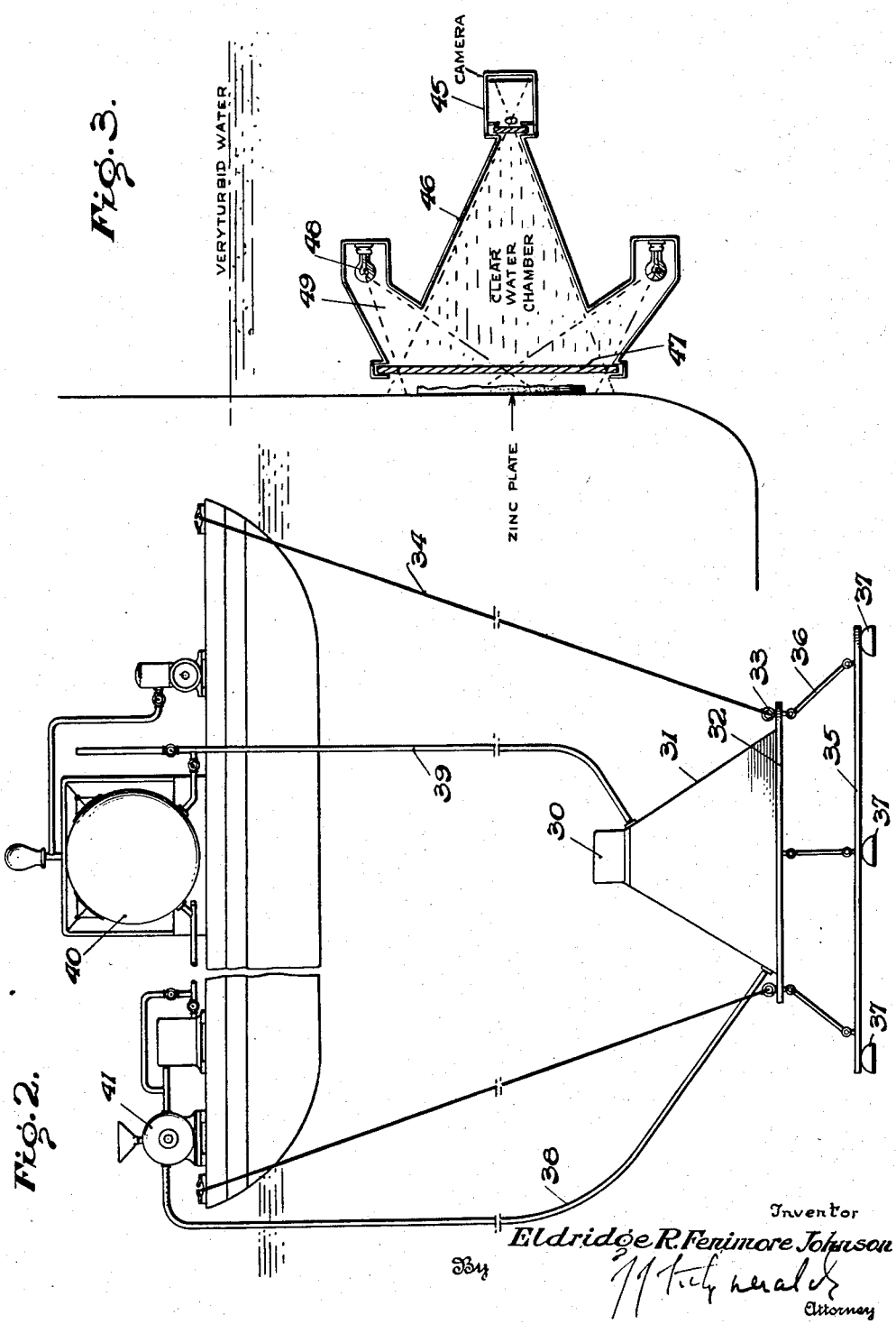

March 12, 1946. E. R. F. JOHNSON 2,396,267
DEVICE FOR VIEWING UNDERWATER BODIES
Filed Oct. 27, 1942 3 Sheets-Sheet 3
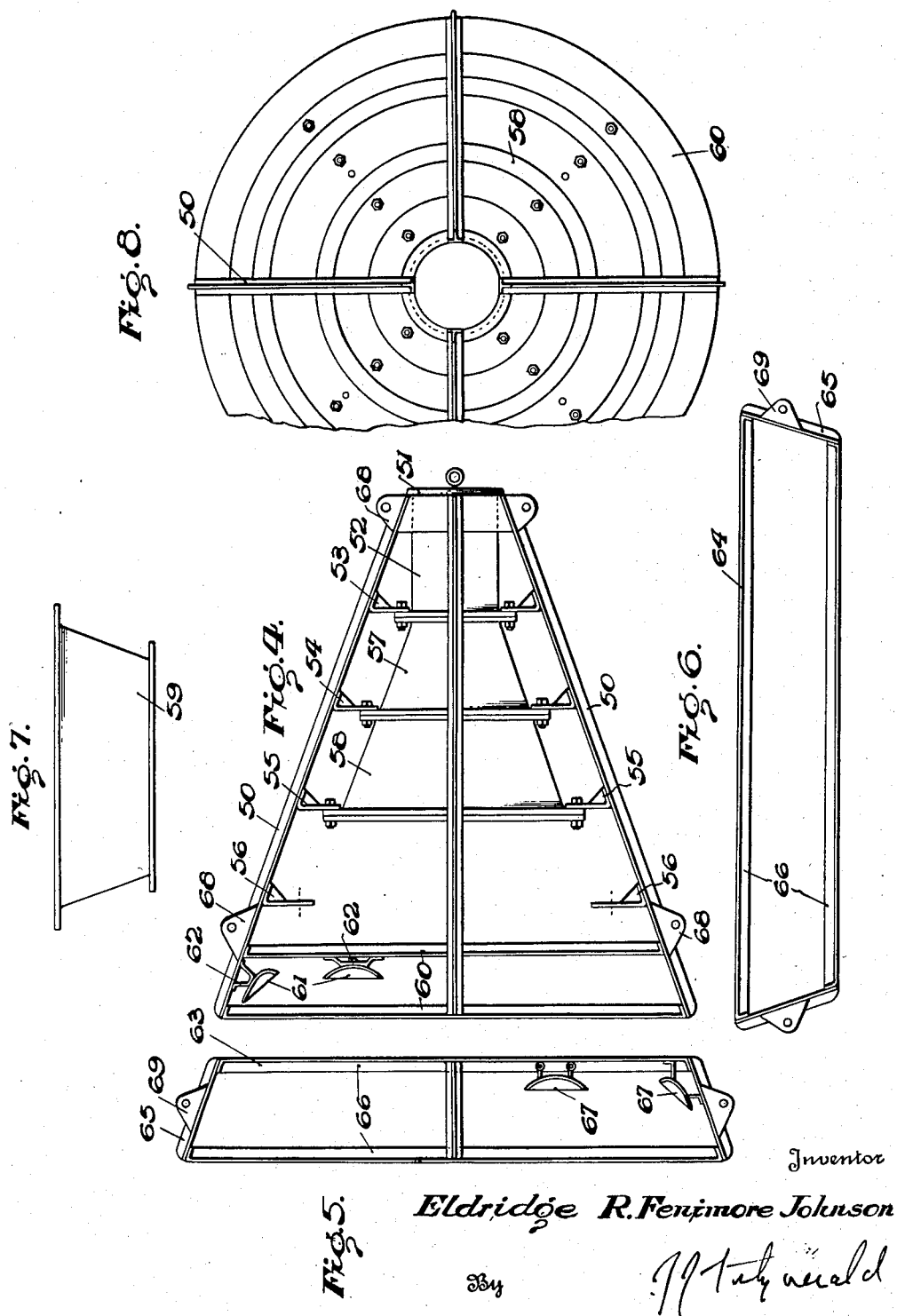
Inventor
Eldridge R. Fenimore Johnson
By
Attorney Patented Mar. 12, 1946

2,396,267

UNITED STATES PATENT OFFICE 2,396,267

DEVICE FOR VIEWING UNDERWATER BODIES

Eldridge R. Fenimore Johnson, United States Navy

Application October 27, 1942, Serial No. 463,555
5 Claims. (Cl. 88—1)

(Granted under the act of March 3, 1883, as amended April 30, 1928; 370 O. G. 757)

This invention relates to viewing and photographing objects submerged in turbid water, as may be encountered in rivers and harbors, for example. More particularly, the invention relates to a novel attachment for use with a water glass, a hydroscope, or an underwater camera, to enable better underwater viewing or photographing when the water is relatively turbid. A device of the character referred to is possessed of a wide utility, as for the examination of underwater bodies to determine the degree or extent of electrolysis or corrosion, surveying underwater damage in the case of vessels and other bodies, viewing or photography of submarine life in bodies of water where the turbidity is such that satisfactory views or photographs cannot otherwise be taken, etc.

It has heretofore been proposed to provide hydroscopes or hydrotelescopes for observing underwater bodies, which may be of varying or adjustable lengths, and to provide watertight cases for cameras which may be lowered on lines or extendible mounts from the surface or carried below by divers. Such devices may be equipped with a source of illumination or depend upon natural light. Some of these devices work well in clear water, and by means of them it is also possible to view or photograph objects in turbid water provided the objective end window of the device can be positioned close enough to the object so that it is within the maximum range of vision for photography over which it is possible to see or photograph in any given body of turbid water. However, the range of vision for photography is only from about eight inches to three feet in many rivers and harbors, especially in those which are commercially important. It is impracticable to use a hydroscope, hydrotelescope, or underwater camera in such rivers and harbors, probably because the area which can be viewed at any given moment, or photographed by single exposure, is too small to be of practical value when the objective window of the device must be placed within three feet of the object.

Some underwater viewing devices, for example the common glass-bottomed bucket or water glass, function only by flattening the surface of the water, that is, the boundary line between the air and the water. Others have an additional function, namely, that of displacing a mass of water from between the eye and the submerged object to be viewed.

It is characteristic of all underwater viewing devices, such as hydroscopes, submarine telescopes, and the like, that when they displace a mass of water they do so by means of an air-filled tube, either straight-sided or tapered and having walls and glass bottoms strong enough to withstand the pressure of the surrounding water. Frequently, weight must be added to their structures to overcome buoyancy, this weight being over and above the weight which is inherent in structures made to withstand water pressure. Because of the weight required to counteract buoyancy, even those viewing devices which extend only a short distance into the water have all been limited to small degrees of taper in the order of five degrees or less, as shown, for example, in the patent to Hubbard, No. 572,803. Even with this small degree of taper, devices having ten to thirty feet of submerged tube are heavy and consequently awkward to transport or use.

It is an object of this invention to provide a device which overcomes these difficulties and which is of light weight, easily transported and positioned, and capable of affording clear views and taking clear photographs of relatively large areas of underwater bodies even though the water is of the aforementioned order of turbidity.

Another object of this invention is to provide a device of the character referred to with means for illuminating the object without the introduction of glare or reflection to interfere with the clarity of the photograph, even when it is impossible to place the illuminating means either around or forward of the object window, as, for example, where the turbidity reduces the range of vision for photography to less than three feet thus making it necessary to position the window at less than three feet from the object, and it is desired to use a window six feet in diameter.

Another object of this invention is to provide a device of the character referred to with means of illumination which do not produce mirrored images of the illuminating means reflected into the eye or camera lens.

Another object of this invention is to provide a device of the character referred to which may be made in relatively small light units or intermediate units or large heavy units, depending upon the size of the area to be viewed, and the depths and turbidity of the water through which the area is to be viewed, or depending upon the size of the area to be photographed and the turbidity of the water through which the area is to be photographed.

Another object of this invention is to provide a device of the character referred to which may be composed of readily built-up units so as to vary the size in conformity with the service to be performed.

Another object of this invention is to provide a device of the character referred to wherein the accessory elements may be conveniently located above the surface of the water.

Another object of this invention is to provide a device of the character referred to which may be conveniently associated with a camera for use on a tripod or operated from a station at or above the surface of the water as convenience requires.

Another object of this invention is to provide a device of the character referred to which is highly flexible in use and capable of a wide variety of applications in improving photographs taken in relatively turbid water.

Other objects will appear as the description of the invention proceeds.

As previously indicated, it has heretofore been proposed to view or photograph underwater bodies by means of a hydrotelescope or other tubular structure wherein an objective lens or window is disposed at the end of a tube, the walls of which may diverge at angles of the order of five degrees depending upon the ratio of the objective lens, or the window, to the eyepiece as determined by the optical train employed, and which may have sources of illumination with or without reflectors disposed at or adjacent the objective lens or window, and which utilize the displacement of water by the more transparent medium of air. However, the present invention utilizes the displacement of turbid water by the more transparent medium of clear water, as hereinafter explained in detail, being thus freed of both buoyancy and the tendency to collapse under the weight of surrounding water. Large, thin and even flexible chamber walls are used which diverge at angles of thirty to ninety degrees and are closed at the large end by a transparent pane six feet or more in diameter, thus greatly increasing the area which may be viewed or photographed in turbid water. Again, whereas it is old to provide a hydrotelescope or glass-ended structure with illuminating and reflecting means at or adjacent to the objective lens or window, the present invention, broadly considered, eliminates glare, reflection, etc., by employing a body of transparent medium, clear water, as above referred to, having an index of refraction which is only slightly different from a glass or plastic window pane and equal to the surrounding turbid water, and thus, if illumination of the object viewed or photographed from forward of the end window is not feasible or desirable, the source of illumination may be placed behind the end window without causing it to glare and is so placed and shielded that its image on the inner surface of the end window is not visible to the eye or camera.

Referring in detail to the accompanying drawings, wherein the same reference characters are employed to designate corresponding parts in the several figures, Fig. 1 is a somewhat schematic view illustrating two embodiments of the invention attached to underwater cameras mounted in different ways;

Fig. 2 is another schematic illustration showing another embodiment of the present invention attached to a camera;

Fig. 3 is a diagrammatic cross section illustrating a third embodiment of the present invention attached to a camera;

Fig. 4 is a schematic elevation of another embodiment of the present invention attached to an underwater camera with both the camera and the embodiment mounted in a framework;

Figs. 5, 6 and 7 are schematic elevations of additional units for use with the embodiment of Fig. 4; and Fig. 8 is an end view, partly broken away, of the embodiment of Fig. 4.

Figure 1:
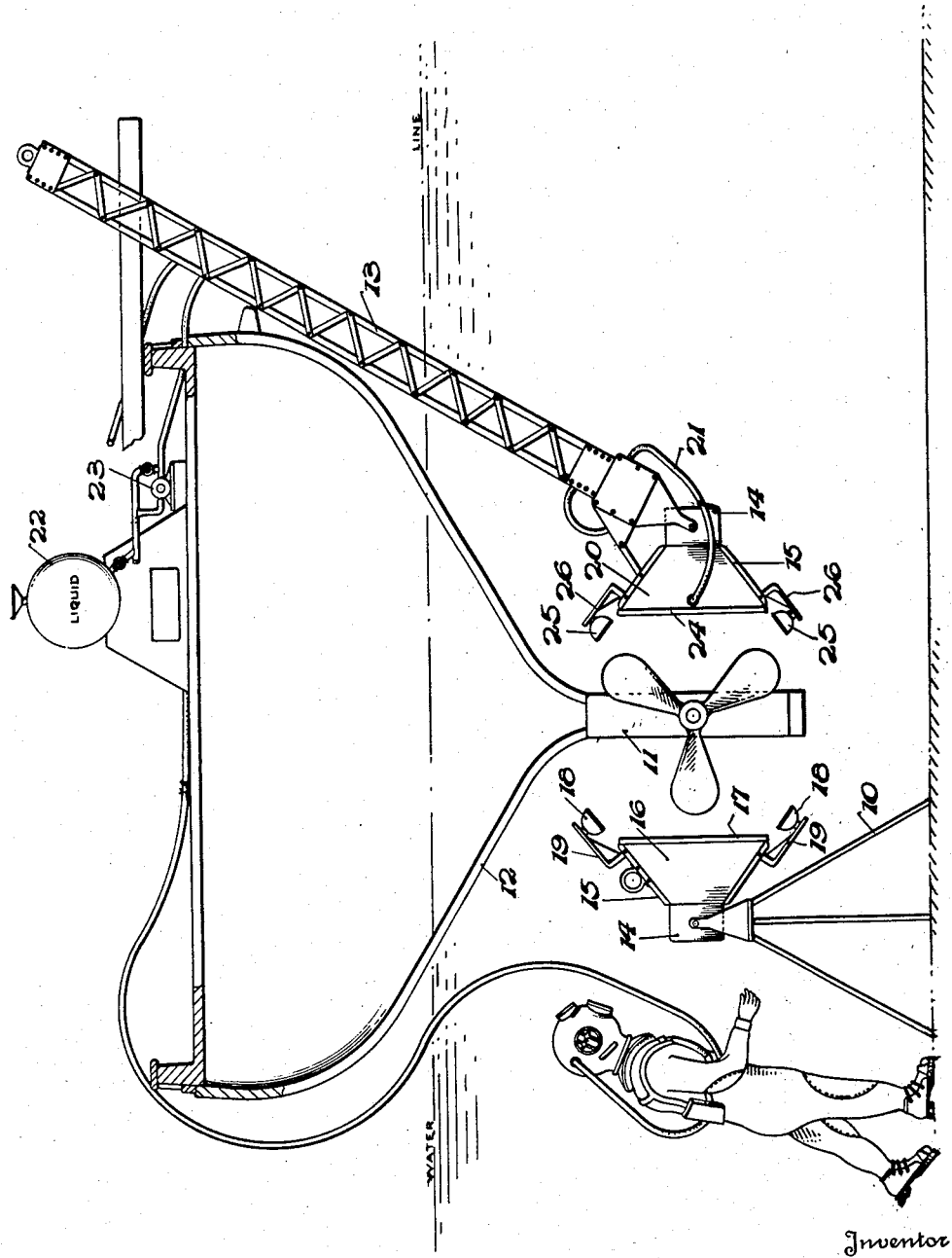

Referring in detail to the accompanying drawings, the several embodiments illustrated are characterized by means, in association with a camera, or an underwater camera, a water glass, or a hydroscope, etc., which may be of any suitable size, character and construction and which forms no part of the present invention. Such means may take the form of an attachment for a camera or water glass, etc., or may take the form of a continuation of a housing of a camera or the continuation of the tubular structure of a water glass, providing an additional chamber for the retention in place between the camera or water glass and the object to be viewed or photographed, of a mass of clear liquid, preferably filtered or distilled water. The transparent wall at the base of the conical or pyramidal container for the clear liquid is preferably made slightly convex so that water flowing across the external surface will not entrain air or form cavitation at the external or end surface to interfere with the clarity of vision or photography. By using a material for the transparent pane having an index of refraction nearly equal to the surrounding turbid water and the contained clear liquid, such slight convexity will not materially distort either vision or photography.

The object to be photographed may be illuminated in any suitable way, as by sources of illumination supported at, around, or outside or in adjacency to the aforesaid front face of the end or object window pane. However, where the device is to be used with its front face relatively close to the photographic or viewed object, so that it is not feasible to place the sources of illumination in front of the front face, the present invention involves the feature of disposing the sources of illumination behind the object end window at such an angle that the mirrored images of the sources of illumination appearing on the said front wall will not be reflected into the eye or camera lens. This may be done when the transparent window pane confining the clear liquid has about the same index of refraction as the clear liquid retained thereby. For example, when the clear liquid is filtered water and the front window is a transparent pane of glass or Lucite, only mirrored images without appreciable surrounding surface glare are formed on said pane by the sources of illumination and by properly selecting the angles of incident said mirrored images may be kept out of the visual or photographic field of view.

Referring now to Fig. 1, the invention is illustrated as embodied in two devices employing the principle of the present invention, one a device attached to an underwater camera mounted on a tripod 10, as when a diver desires to take a photograph in turbid water of an underwater body, such as the keel 11 of a vessel 12, and the other in the form of a device attached to an underwater camera supported by a long boom 13 which may be mounted in any suitable way from the deck of the vessel 12 and which, as illustrated, may take the form of a lazy tongs device so that the depth of immersion may be varied as desired and from which the member 15 may be supported or suspended in any suitable way. In each of these embodiments the camera 14, which may be of any suitable character, has associated therewith, either integrally or by suitable attachment, a conical or pyramidal member 15 adapted to constitute a fluid-tight wall of a windowed chamber for confining a clear liquid. The angle defined by the member 15 preferably coincides approximately with the cone of vision of the camera 14, usually thirty to ninety degrees, and may be made of any suitable length.

The member 15 at the left of Figure 1 may be taken as typical of small size embodiments wherein the transparent medium is a confined body of clear gas such as air, or a clear liquid of such small weight that the device may be filled while on deck, lifted and put overboard, in which case the front wall of the chamber 16 confining said fluid is constituted by a transparent pane 17, preferably having a front face that is slightly convex as above explained, and which is secured in any suitable way in fluid-tight engagement with the lateral wall of the member 15. In this embodiment illumination is provided by one or more lamps 18, with or without reflectors, suitably supported by brackets 19 from the member 15 and disposed forwardly of the pane 17, and at a suitable angle, so as properly to illuminate the object to be photographed.

The member 15 at the right of Figure 1 may be taken as typical of embodiments wherein the length of the member may be increased to the point where it is not practicable to charge it with the clear liquid until the depth of immersion can be kept even with the rise of the water level in the chamber 20, so that the transparent pane 24 will not be broken by pressure either internal or external exerted by a weight of water. In this embodiment the chamber 20 is shown as communicating with a pipe or other suitable conduit 21 through which the liquid that fills said chamber may be suitably supplied from any suitable source, as the container 22 placed on the deck of the vessel 12, a pump being diagrammatically illustrated at 23 for filling and emptying said chamber. As in the first described embodiment, the front of the chamber 20 is completed by a transparent pane 24, preferably having a front surface that is slightly convex as above explained, said pane also preferably having an index of refraction which closely approximates that of the liquid in which the device is immersed, and also the liquid occupying the chamber 20. As in the first described embodiment, illumination may be provided by one or more lamps 25, with or without reflectors, suitably supported in front of the pane 24 as by brackets 26.

The embodiment of Fig. 2 is a form particularly adapted for photographing the bottom, and as here shown the camera 30, of any suitable character, has associated therewith a conical or pyramidal member 31 the angle of whose sides approximates the cone of vision of said camera. The forward face of said member is closed by a transparent pane as before described. As here shown, the larger end of said member 31 is provided with a suitable ring 32 carrying eyebolts 33 so that the device may be suitably suspended from a vessel, float, etc., as by cables 34. In this embodiment a second ring or frame structure 35 is suspended from the ring 32 by suitable links 36 and carries suitable sources of illumination at 37. As illustrated, the member 31 is of the type providing a chamber adapted to be filled with a clear liquid, and to this end said chamber has a suitable conduit 38 communicating therewith and with a source of liquid, a pump 41 being provided for filling from or emptying to the tank 40 the chamber provided by the member 31. The material of which the member 31 is made may be sheet metal of any suitable thickness or may be a flexible waterproof textile fabric. When this member is made of flexible fabric, it may be distended and held in shape by hydraulic force, if the head of water in conduit 38 and container 40 is sufficient to bear the submerged weight of the underwater camera 30. If it is not sufficient, then additional force may be exerted on the head of water by means of the air pump 42.

Another embodiment of the present invention is illustrated in Fig. 3 showing a preferred construction when the device of the present invention is desirably placed so close to the object to be photographed that the mounting of the sources of illumination in front of the larger end of the device is not feasible. As here shown, the camera 45 has associated therewith a conical or pyramidal member 46. As in embodiments earlier described, the large end of the chamber provided by said member 46 is closed by a transparent pane 47 having a fluid tight seal with said member 46 and taking any of the forms heretofore described. In this embodiment, the sources of illumination 48 are disposed in chambers 49 which branch from the main chamber within member 46 and are so constructed and arranged, as illustrated by dotted lines in Fig. 3 that the images of the sources of illumination on the pane 47 are not reflected into the camera lens as may be effected by selecting suitable angles of incidence on the wall 47. The index of refraction of the pane 47 and of the liquid within the chamber 46 is preferably made substantially the same and substantially the same as the liquid in which the device is immersed, whereby only mirrored images of the sources of illumination are formed on the pane 47, and by suitably selecting the angles of incidence these mirrored images may be so located as not to be visible along the optical axis of the camera. There is no wall between the main body of the chamber and the branch chambers 49, so that the lamps 48 are immersed in the clear liquid.

The embodiment of Figs. 4 to 8 illustrates a built-up structure which may be made of any suitable size depending upon the service to be performed. As here shown, a conical or pyramidal frame composed of a suitable number of longitudinal members 50 is mounted on any suitable base ring 51 which may be attached to or form a part of a camera housing here diagrammatically indicated at 52. Frame members 50 carry any suitable number of sets of inwardly extending brackets 53, 54, 55 and 56, to which may be suitably attached, as by bolting, one or more complementary conical or pyramidal structures 57, 58 and 59 (Fig. 7) which may be containers for transparent fluid as heretofore described. Fig. 4 shows two of such members, 57 and 58, in position, and Fig. 7 illustrates at 59 a detached member which may be mounted on the brackets 56 in extension and continuation of the members 57 and 58 if a more extended displacement of the turbid medium is desired. At their outer extremities, the longitudinal members 50 are connected by one or more peripheral rings 60 which may be provided with light sources, with or without reflectors, as indicated at 61 carried by brackets 62 from said longitudinal members or peripheral rings. The frame itself is preferably provided with sections which may be added when extension is desired and removed for compactness in transportation and storage, one section being shown at 63 in Fig. 5, and a second section being shown at 64 in Fig. 6, the latter being of such a size that it can be added to the left-hand side of the section 63 of Fig. 5 as viewed in the drawings. Succeeding sections may be attached to the main frame and to each other in any suitable way. Each of said sections has longitudinally extending members 65 with peripheral rings 66 at their extremities, and one or more of such extensions may be provided with means supplying sources of light as shown at 67 in Fig. 5, so that as the length of the structure as a whole is extended the lights may be advanced to a position at or adjacent to the larger end thereof. The main frame structure 50 is provided with suitable brackets 68 whereby the device may be readily supported or suspended within the turbid medium, and each of the extension pieces, as 63 and 64 in Figs. 5 and 6, is also provided with a similar bracket 69 so that when added to the structure the latter may have one of its supports at or adjacent to the larger end of the assembled device. As will be apparent, when the weight of the structure as a whole is about equal to the weight of the turbid liquid displaced there is almost no limit to the practical size that can be employed by adding sections both to the frame structure and to the means forming or enclosing the transparent medium. The sections 57, 58, 59, etc., may be placed in communication by using a pane only at the forward end of the largest section. In this embodiment the stiffness of the structure as a whole is effected by using a rigid frame construction. However, as next to appear, rigidity may be obtained with use of an otherwise non-rigid structure by employing as the transparent medium a liquid which is maintained under suitable pressure.

The present invention may also be readily embodied in structures that are collapsible, or composed of collapsible sections, to facilitate installation as well as storage and transportation. For example, the embodiment shown in Fig. 2, particularly when built in relatively large sizes, may have member 31 of collapsible construction, composed for example of waterproof reenforced canvas. Such a collapsible unit is much easier to set up in operating position, as well as to store or transport, and when filled with transparent liquid in conformity with the present invention, and the liquid placed under pressure, the desired rigidity may be obtained.

Any suitable means may be employed for imposing the desired pressure on the liquid. Preferably the pressure is imposed by means of a compressible gas, such as air. Thus in the embodiment of Fig. 2 compressed air may be applied to the liquid in member 31 through pipe 39 which is in communication with an air dome 40 associated with any suitable air compressor. By employing compressed gas for imposing pressure on the liquid the amount of pressure can be readily controlled while shocks can be absorbed with less likelihood of damage. At the same time, the liquid in the member 31 being incompressible, the pressure of the gas used to obtain proper rigidity may be the same notwithstanding variations in the depth of submergence. However, within the broader aspects of the present invention the pressure may be applied to the liquid in any other suitable way rather than by gas pressure, as by a mechanical means such as a plunger and weight.

While in the embodiments illustrated on the drawings, and in conformity with the preferred practice, the windowed bag or chamber confining the transparent medium, that is, clear liquid, has been indicated as of conical or pyramidal shape, the invention is not limited thereto, as any other suitable shape of bag or chamber providing the requisite cone of vision may be employed. Thus, for example, the bag or chamber could be of cubical or other suitable polyhedral shape provided the forward face is of the proper size to carry into effect the principles of the present invention.

By using a medium or mediums having an index or indices of refraction not much different from the displaced liquid, glare from the observer's side or the camera's side of all boundary planes between the displaced liquid and said medium or mediums is substantially eliminated when the source of illumination is on the same side of the plane of contact between the displaced liquid and the transparent medium as the camera or the eye of the observer. Then, by increasing the angle between the rays from the source and the axis of the objective, whether the eye or a camera lens, where they intersect upon the boundary between the displaced liquid and the transparent medium, and at the same time shielding the source of the rays so that they cannot cross the axis of the objective lens until they have passed beyond said boundary plane, reflection of the image of the source into the eye of the observer or the lens of the camera is avoided. This involves, as will now be apparent, not only the selection of the angle of incidence but the shielding of the source of illumination as hereinbefore explained. While in the embodiments illustrated the source of illumination has been shown as composed of separate properly shielded lamps, the source of illumination may if desired take any other suitable form as a ring of light in an annular chamber attached to the main member providing the transparent medium, the chamber containing the source of illumination and surrounding said main member being circular or polygonal depending upon the contour of said member.

It will therefore be perceived that by the present invention means have been provided whereby greatly improved photographs may be taken of underwater bodies in relatively turbid water. This has been accomplished with provision for adequate illumination and without the danger of glare that has heretofore been characteristic of devices employing sources of illumination in submarine telescopes or glass-ended structures. The invention may be readily incorporated in camera structures or provided as an accessory therefor. It enables the water-displacing means to have a wide variety of sizes and weights so that it may be satisfactorily used either in small sizes for mounting upon a tripod or in larger sizes, in which event it may be readily operated from above the surface of the water. The apparatus of the present invention may be readily made collapsible, or composed of sections which may be disconnected, for compactness in storage and transportation, and when composed of sections sections may be added to or subtracted to vary the size of the device in conformity with the character of the service to be performed. Difficulties heretofore encountered from glare have been largely avoided. By making the forward face of the transparent mass slightly convex the danger of flowing water introducing difficulties because of bodies of air therein has been substantially if not entirely eliminated. While the invention may be used with sources of illumination in front of the apparatus so as to adequately illuminate the photographic object, the present invention also enables the apparatus to be brought closely adjacent the object to be photographed with disposition of the sources of illumination to the rear of the forward face of the apparatus without introducing the difficulties of glare and reflection heretofore encountered. The device is also relatively simple in character and easily manipulated.

In the appended claims it is to be understood that reference to "viewing" underwater bodies is intended to embrace inspection as well as photographing, and reference to an objective lens is intended to embrace not only the objective lens of a camera but also the objective lens of any suitable optical train or the human eye.

While certain embodiments of the invention have been illustrated with considerable particularity, it is to be expressly understood that they are not intended to indicate the limits of the invention, but rather they have been selected to exemplify different expressions of the invention, others of which will now readily suggest themselves to those skilled in the art, while numerous changes may be made in the details of construction, arrangement, proportion, etc., and certain features may be used without other features, without departing from the spirit of the invention. Reference is therefore to be had to the appended claims for a definition of said invention.

The invention herein described may be manufactured and used by or for the Government of the United States of America for governmental purposes without the payment of any royalties thereon or therefor.

What is claimed is:

1. In an apparatus for viewing an underwater body at a distance in turbid water and having an air chamber provided with a viewing location for receiving an objective lens for viewing the body, the combination of a hollow, closed member covering and aligned with said location and displacing a sufficient portion of the turbid water from the cone of vision from said location to embrace an angle on the order of said cone of vision, the member extending a substantial distance from said location and approximately to said body to be viewed and having a transparent forward end wall aligned with said location and substantially coinciding with said cone of vision, and a clear liquid confined by said member and having generally the same index of refraction as the water, said liquid substantially filling the member whereby the apparatus is of substantially the same specific gravity as the water.

2. In an apparatus for viewing an underwater body at a distance in turbid water and having an air chamber provided with a viewing location for receiving an objective lens for viewing the body, the combination of a hollow, closed member covering and aligned with said location and displacing a sufficient portion of the turbid water from the cone of vision from said location to embrace an angle on the order of said cone of vision, the member extending a substantial distance from said location and approximately to said body to be viewed and having a transparent forward end wall aligned with said location and substantially coinciding with said cone of vision, a clear liquid confined by said member and having generally the same index of refraction as the water, said liquid substantially filling the member whereby the apparatus is of substantially the same specific gravity as the water, and illuminating means mounted on the member rearwardly of said forward end wall for illuminating through said wall the body to be viewed.

3. In an apparatus for viewing an underwater body at a distance in turbid water and having an air chamber provided with a viewing location for receiving an objective lens for viewing the body, the combination of a hollow, closed member covering and aligned with said location and displacing a sufficient portion of the turbid water from the cone of vision from said location to embrace an angle on the order of said cone of vision, the member extending a substantial distance from said location and approximately to said body to be viewed and having a transparent forward end wall aligned with said location and substantially coinciding with said cone of vision, a clear liquid confined by said member and having generally the same index of refraction as the water, said liquid substantially filling the member whereby the apparatus is of substantially the same specific gravity as the water, illuminating means mounted on the member rearwardly of said forward end wall for illuminating through said wall the body to be viewed, and shielding means associated with said illuminating means to prevent reflection of the images of said illuminating means along the axis of the cone of vision from said location.

4. In an apparatus for viewing an underwater body at a distance in turbid water and having an air chamber provided with a viewing location for receiving an objective lens for viewing the body, the combination of a hollow, collapsible member covering and aligned with said location and displacing a sufficient portion of the turbid water from the cone of vision from said location to embrace an angle on the order of said cone of vision, the member extending a substantial distance from said location and approximately to said body to be viewed and having a transparent forward end wall aligned with said location and substantially coinciding with said cone of vision, and a clear liquid confined by said collapsible member and having generally the same index of refraction as the water, said liquid substantially filling the member whereby the apparatus is of substantially the same specific gravity as the water.

5. In an apparatus for viewing an underwater body at a distance in turbid water and having an air chamber provided with a viewing location for receiving an objective lens for viewing the body, the combination of a hollow, collapsible member covering and aligned with said location and displacing a sufficient portion of the turbid water from the cone of vision from said location to embrace an angle on the order of said cone of vision, the member extending a substantial distance from said location and approximately to said body to be viewed and having a transparent forward end wall aligned with said location and substantially coinciding with said cone of vision, a clear liquid confined by said collapsible member and having generally the same index of refraction as the water, said liquid substantially filling the member whereby the apparatus is of substantially the same specific gravity as the water, and means for substantially filling the collapsible member with said liquid from above the surface of the water.

ELDRIDGE R. FENIMORE JOHNSON.